United States Patent
Tabata et al.

(10) Patent No.: US 7,512,474 B2
(45) Date of Patent: Mar. 31, 2009

(54) VEHICLE AND CONTROL METHOD OF VEHICLE

(75) Inventors: Mitsuhiro Tabata, Suntou-gun (JP); Hiroshi Sato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 73 days.

(21) Appl. No.: 11/500,905

(22) Filed: Aug. 9, 2006

(65) Prior Publication Data
US 2007/0050120 A1    Mar. 1, 2007

(30) Foreign Application Priority Data
Aug. 26, 2005    (JP) ............... 2005-245960

(51) Int. Cl.
- *B60T 7/12*    (2006.01)
- *G05D 1/00*    (2006.01)
- *G06F 7/00*    (2006.01)
- *G06F 17/00*    (2006.01)

(52) U.S. Cl. .............. 701/91; 701/54; 701/53; 701/74; 701/75; 701/78; 701/79; 701/83; 701/84; 701/94

(58) Field of Classification Search ........... 701/33, 701/36, 38, 48, 53, 65, 69, 70–71, 78–79, 701/82–84, 94; 303/151, 155, 167, 169, 303/190; 318/52; 180/197, 201; 475/116; 477/40, 182, 183, 184, 185

See application file for complete search history.

(56) References Cited

U.S. PATENT DOCUMENTS

| | | | | | |
|---|---|---|---|---|---|
| 4,717,207 | A | * | 1/1988 | Kubota et al. ........... | 303/3 |
| 4,969,103 | A | * | 11/1990 | Maekawa ............. | 701/96 |
| 5,450,324 | A | * | 9/1995 | Cikanek .............. | 701/108 |
| 5,984,429 | A | * | 11/1999 | Nell et al. ............ | 303/113.4 |
| 6,814,414 | B1 | * | 11/2004 | Schmitt et al. ......... | 303/191 |
| 2003/0040862 | A1 | | 2/2003 | Eckert et al. | |
| 2003/0221881 | A1 | | 12/2003 | Lee | |
| 2006/0145533 | A1 | | 7/2006 | Braeuer et al. | |

FOREIGN PATENT DOCUMENTS

DE    199 17 437 A1    10/2000

(Continued)

*Primary Examiner*—Khoi Tran
*Assistant Examiner*—Bhavesh Amin
(74) *Attorney, Agent, or Firm*—Oliff & Berridge, PLC (57) ABSTRACT

When a driver returns a brake pedal on a climbing road, brakes of front wheels to which power is output from an engine with brakes of rear wheels being held are released (S140), and a throttle opening TH is gradually increased so that a rotation speed of the engine reaches a target rotation speed Ne* according to a road gradient θ (S180). When an outputtable torque Tem that can be output to the front wheels and the rear wheels becomes larger than a target torque Td* according to the road gradient θ, the brakes of the rear wheels are released (S240) to start a vehicle. This allows a smooth start of the vehicle on the climbing road. On the other hand, when a slip of the front wheels is determined before the outputtable torque Tem reaches the target torque Td*, the brakes of the front wheels are returned to the original state, climbing road start control is prohibited (S260 and S270), and a stopping state is held. This properly addresses the problem when the vehicle cannot smoothly start.

16 Claims, 9 Drawing Sheets

FOREIGN PATENT DOCUMENTS

| | | |
|---|---|---|
| DE | 103 24 328 A1 | 2/2004 |
| DE | 103 06 362 A1 | 5/2004 |
| DE | 102 48 813 A1 | 6/2004 |
| JP | A-2000-309261 | 11/2000 |
| JP | A 2001-20777 | 1/2001 |
| JP | A-2004-136883 | 5/2004 |
| JP | A 2004-210110 | 7/2004 |
| JP | A 2005-88787 | 4/2005 |

\* cited by examiner

VEHICLE AND CONTROL METHOD OF VEHICLE

BACKGROUND OF THE INVENTION

1. Field of the Invention

The present invention relates to a vehicle and a control method of the vehicle.

2. Description of the Prior Art

One proposed vehicle includes a brake actuator that is constituted by a motor-driven hydraulic pressure piston and pressurizes and holds a hydraulic pressure in a wheel cylinder of a rear wheel at the stop on a slope (see, for example, Japanese Patent Laid-Open No. 2004-210110). In this proposed vehicle, the hydraulic pressure in the wheel cylinder of the rear wheel is pressurized and held to prevent the vehicle from slipping down at the stop on the slope.

SUMMARY OF THE INVENTION

For such a vehicle that is prevented from slipping down on the slope, if a proper driving force for climbing (a creep torque) is not output when a driver releases the brakes, the vehicle may slip down or drive wheels may slip to prevent a smooth start of the vehicle depending on road gradients.

A vehicle and a control method of the vehicle according to the present invention have an object to smoothly start on a climbing road. The vehicle and the control method of the vehicle according to the present invention have an object to address the problem when the vehicle cannot smoothly start on a climbing road.

In order to achieve at least part of the above described objects, the vehicle and the control method of the vehicle according to the present invention includes units described below.

The present invention is directed to a vehicle including: a power source that can output power to a first axle; a brake operation detection unit that detects a driver's brake operation; a braking force applying unit that applies braking forces to said first axle and a second axle different from said first axle based on the driver's brake operation, and can independently apply the braking forces to said first axle and said second axle regardless of the driver's brake operation; a road gradient detection unit that detects a road gradient in the front-back direction of the vehicle; a target operation state setting module that sets a target operation state that is an operation state of said power source for outputting, to said first axle, a driving force based on said detected road gradient when said road gradient is a climbing gradient; and a control module that performs climbing gradient drive control to control said power source and said braking force applying unit so that when said brake operation detection unit detects an operation of releasing the brakes as the driver's brake operation in a climbing gradient stopping state where the vehicle stops on a climbing gradient with the braking force by said first braking force applying unit, the operation state of said power source gradually enters said target operation state and a braking state in said climbing gradient stopping state is gradually released.

In the vehicle of the present invention, when the road gradient in the front-back direction of the vehicle is the climbing gradient, the target operation state is set that is the operation state of the power source for outputting the driving force based on the road gradient to the first axle to which the power from the power source is output, and the climbing gradient drive control is performed for control so that when the driver releases the brakes in the climbing gradient stopping state where the vehicle stops on the climbing gradient with the braking force based on the driver's brake operation, the operation state of the power source gradually enters the target operation state and the braking state in the climbing gradient stopping state is gradually released. Specifically, when the driver releases the brakes, the power output from the power source to the first axle is gradually increased and the braking forces of the first axle and the second axle are gradually released. This allows a smooth start of the vehicle on the climbing gradient. Further, the target operation state is set so that the driving force based on the road gradient is output to the first axle, thereby inhibiting the vehicle from slipping down when the driver releases the brakes. The power source includes an internal combustion engine or a motor.

In the vehicle according to the present invention, the climbing gradient drive control may be control to release the braking state in the climbing gradient stopping state through an intermediate braking force holding state of releasing the braking force to the first axle while holding the braking force to the second axle in the climbing gradient stopping state. In this case, the climbing gradient drive control may be control to enter the intermediate braking force holding state when the operation of releasing the brakes is detected in the climbing gradient stopping state, and release the braking force to the second axle after the operation state of the power source enters the target operation state. This allows a start while inhibiting the vehicle from slipping down by the braking force to the second axle.

The vehicle according to the present invention may include a slip detection unit that detects a slip caused by idling of the first axle, and the control module may control to enter the climbing gradient stopping state and prohibits the performance of the climbing gradient drive control when the slip detection unit detects a slip during performance of the climbing gradient drive control. This prevents the vehicle from slipping down or prevents the position of the vehicle from being unstable even when the vehicle cannot start on the climbing gradient.

The vehicle according to the present invention further includes a rotation detection unit that detects a rotation of said second axle, wherein said control module, when said rotation detection unit detects a rotation of said second axle in a reverse direction relative to a forward direction during performance of said climbing gradient drive control, performs control to enter said climbing gradient stopping state and prohibits the performance of said climbing gradient drive control. This inhibits the vehicle from slipping down.

In the vehicle according to the present invention that prohibits the performance of the climbing gradient drive control, said control module may remove the prohibition of the performance of the climbing gradient drive control when the vehicle moves or the running direction of the vehicle is changed while the performance of the climbing gradient drive control is prohibited. This again allows the start by the climbing gradient drive control.

The vehicle according to the present invention further includes an accelerator operation detection unit that detects a driver's accelerator operation, wherein said control module performs accelerator operating control to control said braking force applying unit so as to release the braking force to said first axle and the braking force to said second axle when said accelerator operation detection unit detects the accelerator operation. This allows control according to a driver's accelerator operation.

The vehicle according to the present invention may include a motor that can input and output power to and from the second axle, and the control module may control the motor based on the driver's accelerator operation. In this case, the control module may control to output power from the motor when the operation state of the power source enters the target operation state. This prevents drive control of the motor when the vehicle has not yet started.

The present invention is directed to a control method of the vehicle at the stop on a climbing gradient, said vehicle including: a power source that can output power to a first axle; and a braking force applying unit that can independently adjust a braking force to said first axle and a braking force to a second axle different from said first axle, said control method including the steps of: (a) setting a target operation state that is an operation state of said power source for outputting, to said first axle, a driving force based on a road gradient from a climbing gradient stopping state where the vehicle stops on the climbing gradient by a driver's brake operation to release of the driver's brake operation; and (b) performing climbing gradient drive control to control said power source and said braking force applying unit so that when the driver's brake operation is released, the operation state of said power source gradually enters said target operation state and a braking state by the driver's brake operation is gradually released.

In the control method of the vehicle of the present invention, setting a target operation state that is the operation state of the power source for outputting the driving force based on the road gradient to the first axle which the power from the power source is output from the climbing gradient stopping state where the vehicle stops on the climbing gradient by a driver's brake operation to the release of the driver's brake operation, performing climbing gradient drive control to control the power source and the braking force applying unit when the driver's brake operation is released, the operation state of the power source gradually enters target operation state and a braking state by the driver's brake operation is gradually released. Specifically, when the driver releases the brakes, the power output from the power source to the first axle is gradually increased and the braking forces of the first axle and the second axle are gradually released. This allows a smooth start of the vehicle on the climbing gradient. Further, the target operation state is set so that the driving force based on the road gradient is output to the first axle, thereby inhibiting the vehicle from slipping down when the driver releases the brakes. The power source includes an internal combustion engine or a motor.

In the control method of the vehicle according to the present invention, wherein said step (b) controls to release the braking state in said climbing gradient stopping state through an intermediate braking force holding state of releasing the braking force to said first axle while holding the braking force to said second axle in said climbing gradient stopping state. In this case, wherein said step (b) may be control to enter the intermediate braking force holding state when the operation of releasing the brakes is detected in the climbing gradient stopping state, and release the braking force to the second axle after the operation state of the power source enters the target operation state. This allows a start while inhibiting the vehicle from slipping down by the braking force to the second axle.

In the control method of the vehicle according to the present invention, wherein said step (b) is the step of controlling to enter said climbing gradient stopping state and prohibits the performance of said climbing gradient drive control when a slip is caused by idling of said first axle during performance of said climbing gradient drive control. This prevents the vehicle from slipping down or prevents the position of the vehicle from being unstable even when the vehicle cannot start on the climbing gradient.

In the control method of the vehicle according to the present invention, wherein said step (b), when said second axle rotates in a reverse direction relative to a forward direction during performance of said climbing gradient drive control, performs control to enter said climbing gradient stopping state and prohibits the performance of said climbing gradient drive control. This inhibits the vehicle from slipping down.

In the control method of the vehicle according to the present invention that prohibits the performance of the climbing gradient drive control, said step (b) may remove the prohibition of the performance of the climbing gradient drive control when the vehicle moves or the running direction of the vehicle is changed while the performance of the climbing gradient drive control is prohibited. This again allows the start by the climbing gradient drive control.

The control method of the vehicle according to the present invention further includes an accelerator operation detection unit that detects a driver's accelerator operation, wherein said step (b) is the step of controlling said braking force applying unit so as to release the braking force to said first axle and the braking force to said second axle when the driver performs the accelerator operation. This allows control according to a driver's accelerator operation.

DESCRIPTION OF THE PREFERRED EMBODIMENTS

Figure 1:
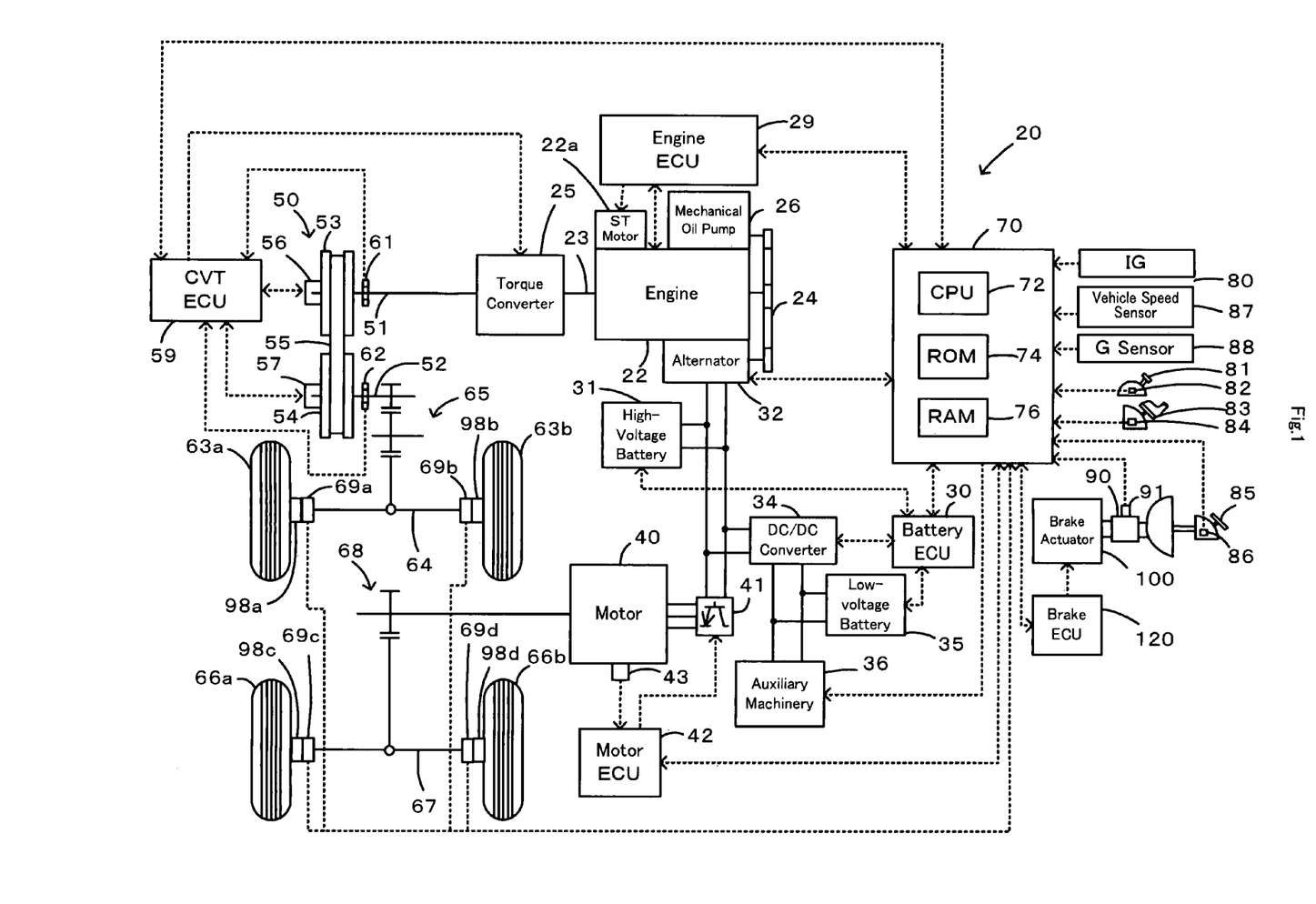
FIG. 1 schematically illustrates the configuration of a hybrid vehicle 20 in one embodiment of the present invention.

Now, a preferred embodiment of the present invention will be described. FIG. 1 schematically illustrates the configuration of a hybrid vehicle 20 in one embodiment of the present invention. The hybrid vehicle 20 in the embodiment is configured as a vehicle drivable by four wheel drive, and includes a front-wheel drive system that outputs power from an engine 22 as a power source to a front shaft 64 via a torque converter 25, a CVT 50 as a continuously variable transmission, and a gear mechanism 65 to drive front wheels 63a and 63b, a rear wheel driving system that outputs power from a motor 40 to a rear shaft 67 via a gear mechanism 68 to drive rear wheels 66a and 66b, a brake actuator 100 for controlling a hydraulic pressure to brake wheel cylinders 98a to 98d of the front and rear wheels 63a, 63b, 66a and 66b, and a hybrid electronic control unit 70 that controls the entire device.

Figure 2:
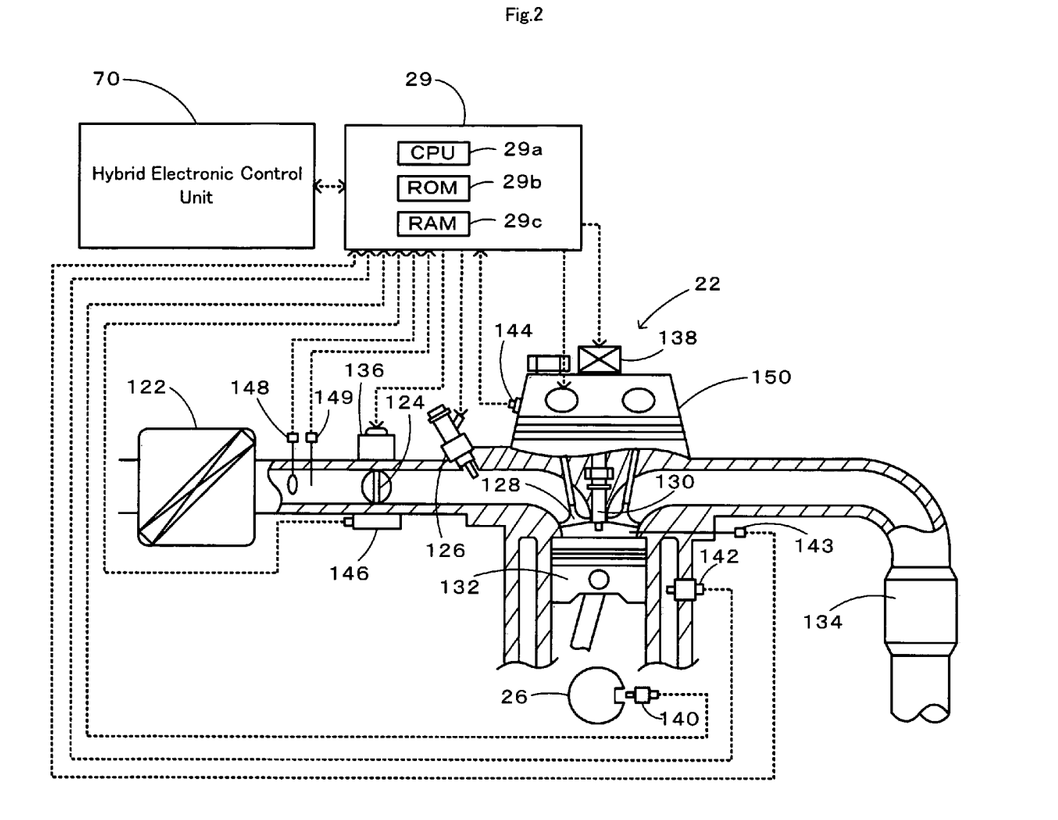
FIG. 2 schematically illustrates the configuration of an engine 22.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 23. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 29 (hereafter referred to as engine ECU 29). The engine ECU 29 is constructed as a microprocessor including a CPU 29a, a ROM 29b that stores processing programs, a RAM 29c that temporarily stores data, input and output ports (not shown), and a communication port (not shown). The engine ECU 29 receives, via its input port (not shown), signals from various sensors that measure and detect the conditions of the engine 22. The signals input into the engine ECU 29 include a crank position from a crank position sensor 140 detected as the rotational position of the crankshaft 23, a cooling water temperature from a water temperature sensor 142 measured as the temperature of cooling water in the engine 22, an in-cylinder pressure Pin from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal AF from an air flow meter 148 attached to an air intake conduit, and an intake air temperature from a temperature sensor 149 attached to the air intake conduit. The engine ECU 29 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 29 communicates with the hybrid electronic control unit 70. The engine ECU 29 receives control signals from the hybrid electronic control unit 70 to drive and control the engine 22, while outputting data regarding the driving conditions of the engine 22 to the hybrid electronic control unit 70 according to the requirements.

A starter motor 22a is attached to the crankshaft 23 of the engine 22. An alternator 32 and a mechanical oil pump 26 are also connected to the crankshaft 23 via a belt 24. The alternator 32 consumes the output power of the engine 22 and generates electric power to be supplied to the motor 40. The mechanical oil pump 26 consumes the output power of the engine 22 and generates hydraulic line pressures to actuate the CVT 50.

The torque converter 25 is a known hydraulic torque converter with a lockup clutch and outputs a torque corresponding to a rotation speed of the engine 22 to the CVT 50 on a start of the hybrid vehicle 20 or during a low-speed drive of the hybrid vehicle 20. The lockup clutch of the torque converter 25 is under control of a CVTECU 59 (discussed below).

The CVT 50 includes a primary pulley 53 that has a variable groove width and is linked to an input shaft 51, a secondary pulley 54 that has a variable groove width and is linked to an output shaft 52 or a driveshaft, a belt 55 that is set in the grooves of the primary pulley 53 and the secondary pulley 54, and hydraulic first and second actuators 56 and 57 that respectively vary the groove widths of the primary pulley 53 and the secondary pulley 54. Varying the groove widths of the primary pulley 53 and the secondary pulley 54 by the first actuator 56 and the second actuator 57 attains the continuously variable speed to convert the power of the input shaft 51 and output the converted power to the output shaft 52. A CVT electronic control unit 59 (hereafter referred to as CVTECU 59) takes charge of the transmission control of the CVT 50. The CVTECU 59 receives a rotation speed Nin of the input shaft 51 from a rotation speed sensor 61 attached to the input shaft 51 and a rotation speed Nout of the output shaft 52 from a rotation speed sensor 62 attached to the output shaft 52. The CVTECU 59 outputs driving signals to the first actuator 56 and to the second actuator 57. The CVTECU 59 communicates with the hybrid electronic control unit 70. The CVTECU 59 receives control signals from the hybrid electronic control unit 70 to regulate the change gear ratio of the CVT 50, while outputting data regarding the operating conditions of the CVT 50, for example, the rotation speed Nin of the input shaft 51 and the rotation speed Nout of the output shaft 52, to the hybrid electronic control unit 70 according to the requirements.

The motor 40 is constructed as a known synchronous motor generator that may be actuated both as a generator and as a motor. The motor 40 receives and transmits electric power from and to a high-voltage battery 31 via an inverter 41 and receives a supply of electric power from the alternator 32. The motor 40 is under operation control of a motor electronic control unit 42 (hereafter referred to as motor ECU 42). The motor ECU 42 receives various signals required for operating and controlling the motor 40, for example, signals from a rotational position detection sensor 43 that detects the rotational position of a rotor in the motor 40 and signals representing phase currents applied to the motor 40 from an electric current sensor (not shown). The motor ECU 42 also establishes communication with the hybrid electronic control unit 70. The motor ECU 42 outputs switching control signals to the inverter 41 in response to control signals received from the hybrid electronic control unit 70 to operate and control the motor 40, while outputting data regarding the operating conditions of the motor 40 to the hybrid electronic control unit 70 according to the requirements.

A high-voltage battery 31 is a secondary battery having a rated voltage Vh (for example, 42 [V]) and functions to accumulate electric power supplied from the alternator 32 and to transmit electric power to and from the motor 40. The high-voltage battery 31 is connected to a low-voltage battery 35 and auxiliary machinery 36 via a DC-DC converter 34 to supply electric power to the low-voltage battery 35 and the auxiliary machinery 36. The low-voltage battery 35 is a secondary battery having a lower rated voltage V1 (for example, 12 [V]) than the rated voltage Vh of the high-voltage battery 31. The high-voltage battery 31, the low-voltage battery 35, and the DC-DC converter 34 are under management and control of a battery electronic control unit 30 (hereafter referred to as battery ECU 30). The battery ECU 30 receives diverse signals required for control and management of the high-voltage battery 31 and the low-voltage battery 35, for example, inter-terminal voltages, charge-discharge electric currents, and battery temperatures of the respective batteries 31 and 35 measured by relevant sensors (not shown). The battery ECU 30 also establishes communication with the hybrid electronic control unit 70 and outputs data regarding the operating conditions of the respective batteries 31 and 35 to the hybrid electronic control unit 70 according to the requirements. The battery ECU 30 computes states of charges (SOC) of the high-voltage battery 31 and the low-voltage battery 35 from integrated values of charge-discharge currents for management of the respective batteries 31 and 35.

Figure 3:
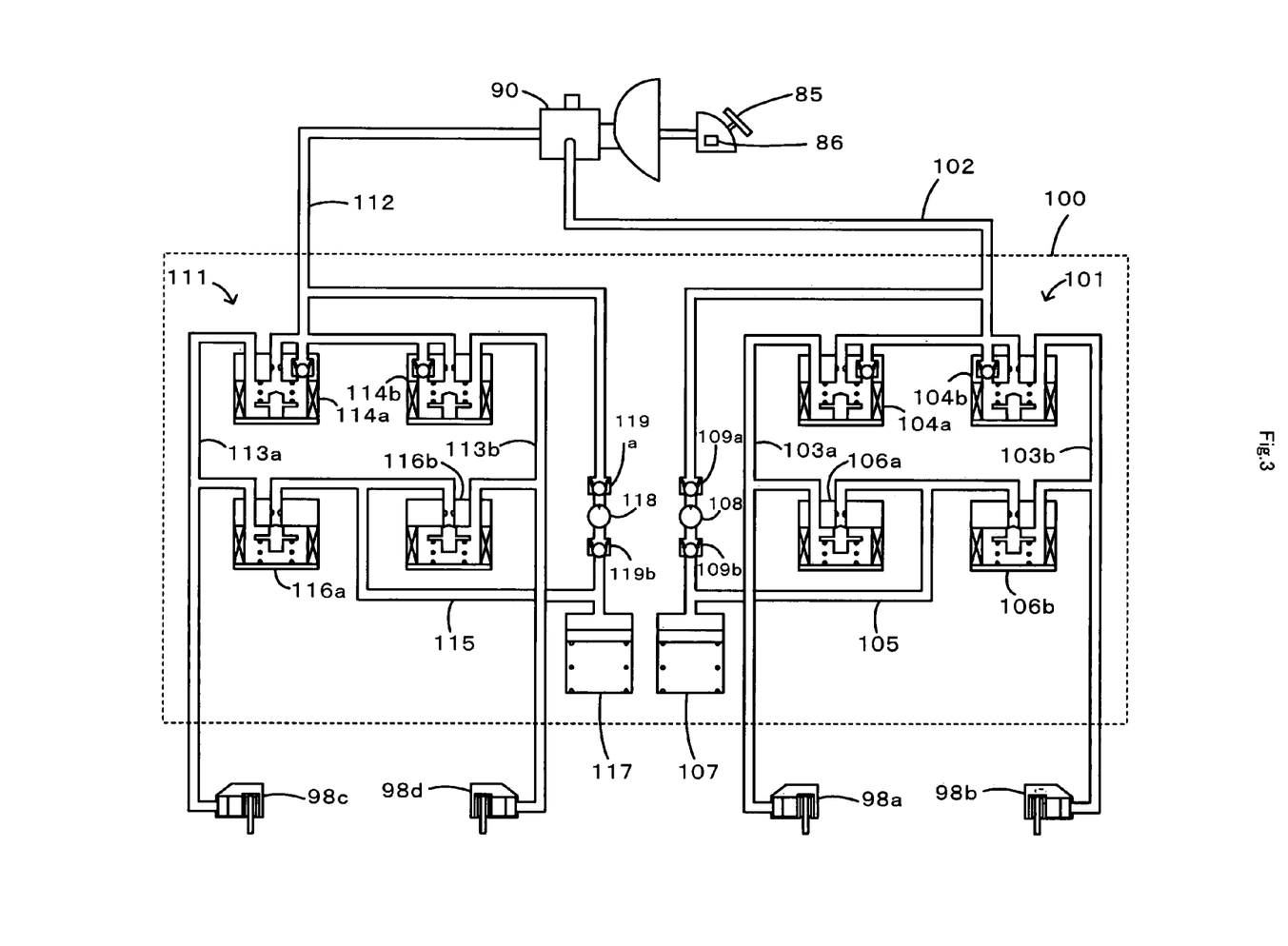
FIG. 3 schematically illustrates the configuration of a brake actuator 100.

As shown in FIG. 3, the brake actuator 100 is constituted by a front wheel brake actuator 101 and a rear wheel brake actuator 111. The front wheel brake actuator 101 includes left and right holding solenoid valves 104a and 104b connected to a brake master cylinder 90 via a supply oil passage 102 and connected to brake wheel cylinders 98a and 98b of the front wheels 63a and 63b via pressure increasing and reducing oil passages 103a and 103b, pressure reducing solenoid valves 106a and 106b similarly connected to the wheel cylinders 98a and 98b of the front wheels 63a and 63b via the pressure increasing and reducing oil passages 103a and 103b and connected to a reservoir 107 via a pressure reducing oil passage 105, and an oil pump 108 that pressurizes oil in the reservoir 107 and supplies the oil to the supply oil passage 102. Two back flow valves 109a and 109b for preventing backflow are provided upstream and downstream of the oil pump 108. The holding solenoid valves 104a and 104b are configured as normally open solenoid valves that are closed when energized (turned on), and include check valves for returning brake oil to the supply oil passage 102 when a cylinder hydraulic pressure in the brake wheel cylinders 98a and 98b is higher than a hydraulic pressure in the supply oil passage 102 even if the solenoid valves are turned on and closed. The pressure reducing solenoid valves 106a and 106b are configured as normally closed solenoid valves that open when energized (turned on). Like the front wheel brake actuator 101, the rear wheel brake actuator 111 includes left and right holding solenoid valves 114a and 114b connected to the brake master cylinder 90 via a supply oil passage 112 and connected to brake wheel cylinders 98c and 98d of the rear wheels 66a and 66b via pressure increasing and reducing oil passages 113a and 113b, pressure reducing solenoid valves 116a and 116b similarly connected to the wheel cylinders 98c and 98d of the rear wheels 66a and 66b via the pressure increasing and reducing oil passages 113a and 113b and connected to a reservoir 117 via a pressure reducing oil passage 115, an oil pump 118 that pressurizes oil in the reservoir 117 and supplies the oil to the supply oil passage 112, and two backflow valves 119a and 119b. The holding solenoid valves 114a and 114b and the pressure reducing solenoid valves 116a and 116b of the rear wheel brake actuator 111 have the same configurations as the holding solenoid valves 104a and 104b and the pressure reducing solenoid valves 106a and 106b of the front wheel brake actuator 101. The description below on the operations of the front wheel brake actuator 101 applies to the description on the operations of the rear wheel brake actuator 111. Now, the operations of the front wheel brake actuator 101 will be briefly described.

When a driver depresses a brake pedal 85 with the holding solenoid valves 104a and 104b and the pressure reducing solenoid valves 106a and 106b being all turned off (the state in FIG. 3), a master pressure according to the depression amount is generated in the brake master cylinder 90, thus the brake oil is supplied to the brake wheel cylinders 98a and 98b via the supply oil passage 102, the holding solenoid valves 104a and 104b, and the pressure increasing and reducing oil passages 103a and 103b, and the cylinder hydraulic pressure in the brake wheel cylinders 98a and 98b is pressurized to apply a braking force according to the cylinder hydraulic pressure to the front wheels 63a and 63b. When the driver returns the brake pedal 85 in this state, the brake oil in the brake wheel cylinders 98a and 98b is returned to the brake master cylinder 90 via the pressure increasing and reducing oil passages 103a and 103b, the holding solenoid valves 104a and 104b, and the supply oil passage 102, and the cylinder hydraulic pressure is reduced in response to the return to release the braking force applied to the front wheels 63a and 63b. Besides such normal operations, the front wheel brake actuator 101 can hold the cylinder hydraulic pressure in the brake wheel cylinders 98a and 98b by turning on the holding solenoid valves 104a and 104b. At this time, if the pressure reducing solenoid valves 106a and 106b are turned on (opened) the brake oil in the brake wheel cylinders 98a and 98b can be guided to the reservoir 107 via the pressure increasing and reducing oil passages 103a and 103b, the pressure reducing solenoid valves 106a and 106b, and the pressure reducing oil passage 105 to reduce the cylinder hydraulic pressure in the brake wheel cylinders 98a and 98b. The degree of reduction in the cylinder hydraulic pressure can be adjusted according to time at which the pressure reducing solenoid valves 106a and 106b are turned on (opened). The oil pump 108 is driven to supply the pressurized brake oil to the brake wheel cylinders 98a and 98b via the supply-oil passage 102, the holding solenoid valves 104a and 104b, and the pressure increasing and reducing oil passages 103a and 103b to pressurize the cylinder hydraulic pressure in the brake wheel cylinders 98a and 98b. At this time, the holding solenoid valves 104a and 104b are turned on (closed) to stop pressurization of the cylinder hydraulic pressure, and thus the degree of increase in the cylinder hydraulic pressure can be adjusted according to time before the holding solenoid valves 104a and 104b are turned on (closed). The holding solenoid valves 104a and 104b are turned on (closed) to enter the above described state of holding the cylinder hydraulic pressure, and thus the pressure reducing solenoid valves 106a and 106b may be turned on (opened) to reduce the pressure. Specifically, the oil pump 108 is driven, and the holding solenoid valves 104a and 104b and the pressure reducing solenoid valves 106a and 106b are turned on/off, thereby allowing the cylinder hydraulic pressure in the brake wheel cylinders 98a and 98b to be freely adjusted. The holding solenoid valves 104a and 104b and the pressure reducing solenoid valves 106a and 106b can be independently turned on/off, and thus the cylinder hydraulic pressure in the brake wheel cylinders 98a and 98b can be independently freely adjusted.

The brake actuator 100 is driven and controlled by a brake electronic control unit (herein after referred to as a brake ECU) 120. The brake ECU 120 receives inputs of signals such as wheel speeds Vw1 to Vw4 from wheel speed sensors 69a to 69d or a steering angle from an unshown steering angle sensor through an unshown signal line, and performs an antilock brake system (ABS) function that prevents a slip of any of the front wheels 63a and 63b and the rear wheels 66a and 66b caused by locking when the driver depresses the brake pedal 85, traction control (TRC) that prevents a slip of any of the front wheels 63a and 63b and the rear wheels 66a and 66b that are drive wheels caused by idling when the driver depresses the accelerator pedal 83, or vehicle stability control (VSC) that holds the position of the vehicle while turning.

The brake ECU 120 communicates with the hybrid electronic control unit 70, drives and controls the brake actuator 100 according to control signals from the hybrid electronic control unit 70, and outputs data on the operation state of the motor 40 to the hybrid electronic control unit 70 as required.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 87, and a longitudinal acceleration G (acceleration in a longitudinal direction along the front to the rear of the hybrid vehicle 20) from a G sensor 88, a brake pressure Pb from a pressure sensor 91 attached to a brake master cylinder 90 that applies a hydraulic pressure (master cylinder pressure) to brake oil in response to the driver's operation of the brake pedal 85, and wheel speeds Vw1 through Vw4 from wheel speed sensors 69a through 69d respectively attached to the front wheels 63a and 63b and the rear wheels 66a and 66b. The hybrid electronic control unit 70 outputs, via its output port, control signals to the alternator 32 and driving signals to the auxiliary machinery 36. The hybrid electronic control unit 70 transmits various control signals and data to and from the engine ECU 29, the battery ECU 30, the motor ECU 42, and the CVTECU 59.

Figure 4:
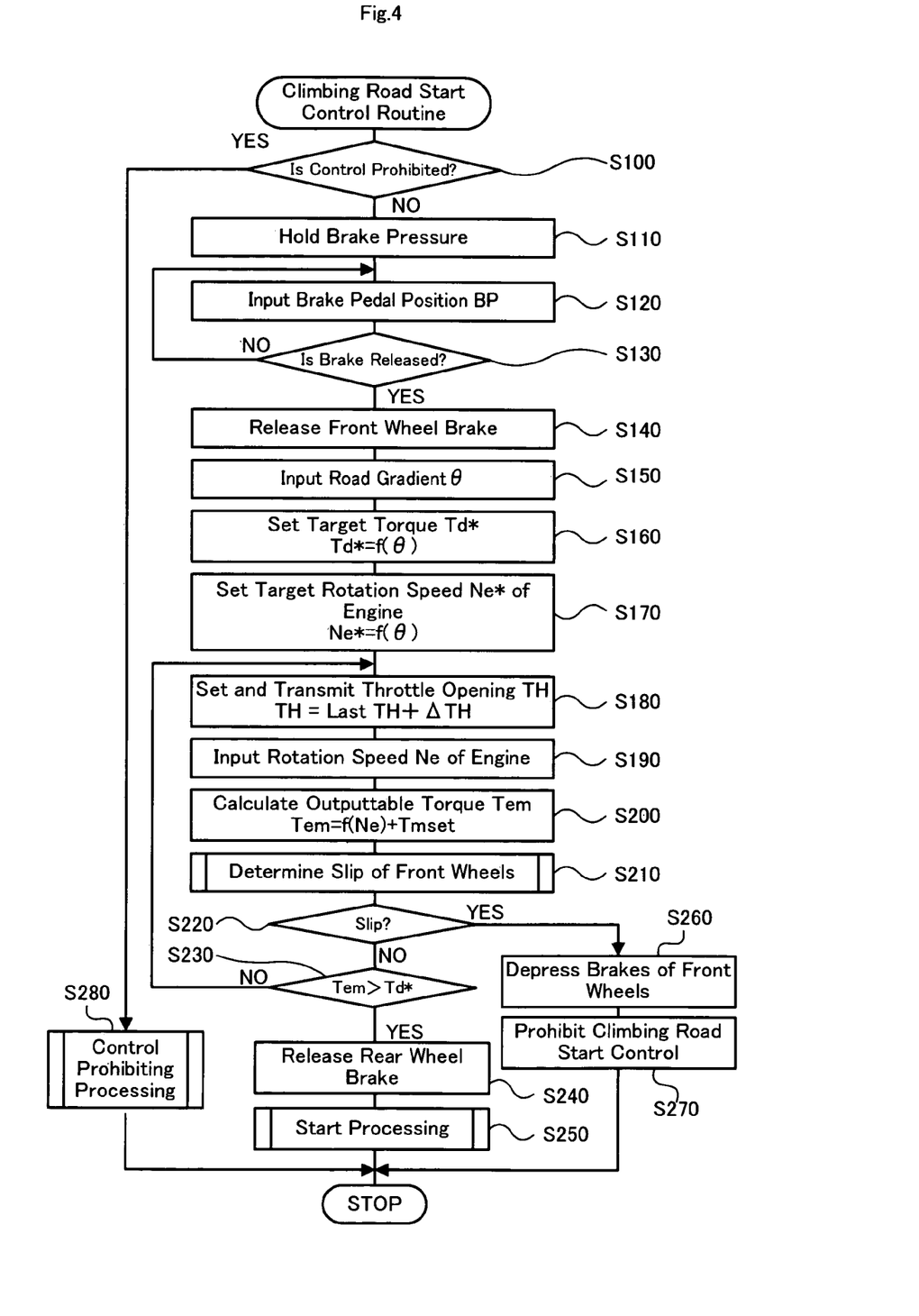
FIG. 4 is a flowchart showing one example of a climbing road start control routine executed by a hybrid electronic control unit 70.

The description now regards the operations of the hybrid vehicle 20 having the configuration discussed above, and more particularly the operations at the start of the hybrid vehicle 20 on a climbing road having a predetermined road gradient θ (for example, 5 degree or more). FIG. 4 is a flowchart showing a climbing road start control routine executed by the hybrid electronic control unit 70 at the stop on a climbing road. This routine is repeatedly executed until the start of the vehicle is completed.

When the climbing road start control routine is executed, the CPU 72 of the hybrid electronic control unit 70 determines whether the control is prohibited (Step S100). The prohibition of the control is performed in this control. The prohibition of the control will be described below. When the climbing road start control is not prohibited, the cylinder pressure in the brake wheel cylinders 98a to 98d of the front wheels 63a and 63b and the rear wheels 66a and 66b by driver's depression of the brake pedal 85 is held (Step S110), and driver's release of the depression of the brake pedal 85 based on the brake pedal position BP from the brake pedal position sensor 86 is waited (Steps S120 and S130). The brake wheel cylinders 98a to 98d can be held by turning on (closing) the holding solenoid valves 104a, 104b, 114a and 114b. Specifically, the brake wheel cylinders 98a to 98d can be held by transmitting the control signals from the hybrid electronic control unit 70 to the brake ECU 120, and the brake ECU 120 turning on the holding solenoid valves 104a, 104b, 114a, and 114b based thereon.

Figure 5:
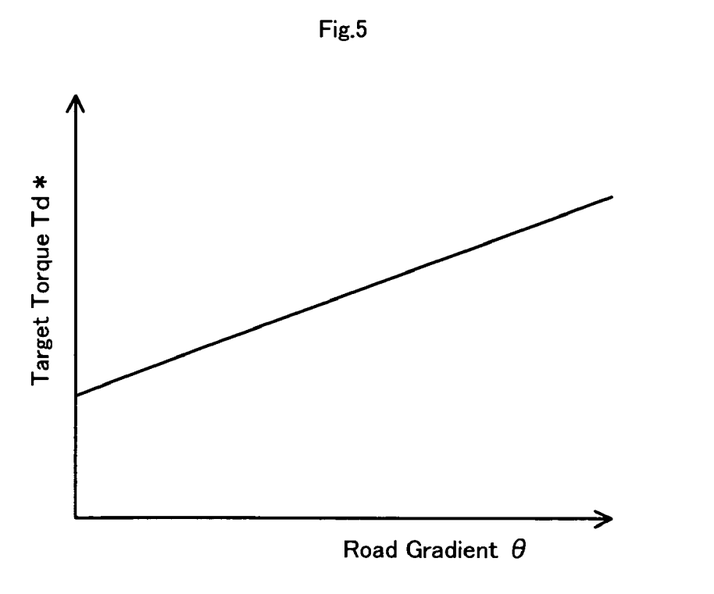
FIG. 5 shows one example of a target torque setting map.
Figure 6:
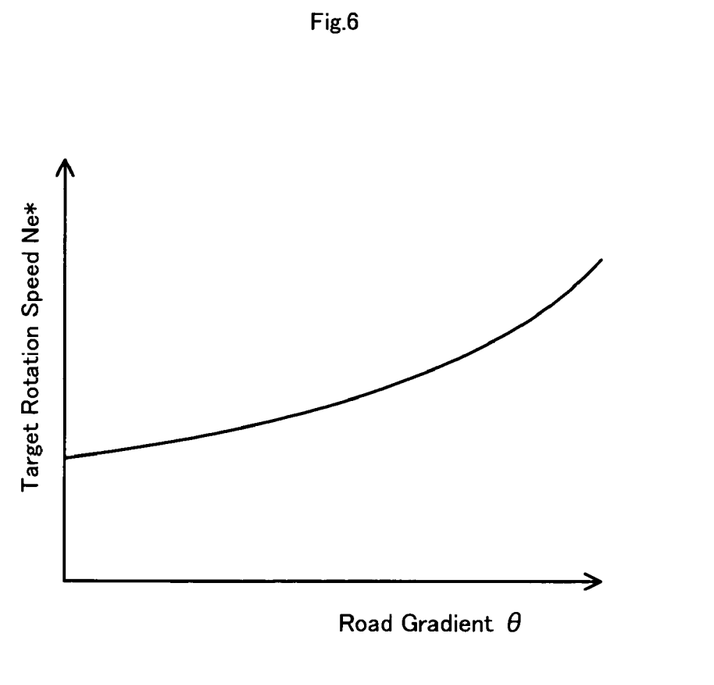
FIG. 6 shows one example of a target rotation speed setting map.

When the driver releases the depression of the brake pedal 85, the cylinder pressure only in the brake wheel cylinders 98a and 98b of the front wheels 63a and 63b is released with the cylinder pressure in the brake wheel cylinders 98c and 98d of the rear wheels 66a and 66b being held (Step S140). The brake of the front wheels 63a and 63b can be released by transmitting a control signal to the brake ECU 120 to turn on (open) the pressure reducing solenoid valves 106a and 106b. A road gradient θ in the front-back direction of the vehicle is input (Step S150), and a target torque Td* to be output to the front wheels 63a and 63b and the rear wheels 66a and 66b and a target rotation speed Ne* of the engine 22 are set based on the road gradient θ (Steps S160 and S170). The input road gradient θ in the front-back direction of the vehicle is a road gradient calculated from the acceleration G in the front-back direction from a G sensor 88 and written in a predetermined area in the RAM 76. The target torque Td* is set as a driving force that allows the vehicle to run at a relatively low fixed vehicle speed (for example, 4 km/h) on the road gradient θ. In the embodiment, the relationship between the road gradient θ and the target torque Td* is previously determined and stored in the ROM 74 as a target torque setting map, and when the road gradient θ is provided, a corresponding target torque Td* is derived from the map and set. FIG. 5 shows one example of the target torque setting map. The target rotation speed Ne* of the engine 22 is a rotation speed that allows a torque to be output to the front wheels 63a and 63b to be output when the target torque Td* is output to the front wheels 63a and 63b with predetermined front and rear distribution. In the embodiment, the relationship between the road gradient θ and the target rotation speed Ne* is previously determined and stored in the ROM 74 as a target rotation speed setting map, and when the road gradient θ is provided, a corresponding target rotation speed Ne* is derived from the map and set. FIG. 6 shows one example of the target rotation speed setting map.

Then, when a throttle opening TH is increased by a small amount ΔTH and transmitted to the engine ECU 24 (Step S180), and the rotation speed Ne of the engine 22 is input (Step S190), an outputtable torque Tem is calculated as the sum of the torque output from the engine 22 to the front wheels 63a and 63b based on the input rotation speed Ne of the engine 22 (indicated as f(Ne) in FIG. 4) and a torque outputtable from the motor 40 (indicated as Tmset in FIG. 4) (Step S200), it is checked that no slip is caused by idling of the front wheels 63a and 63b (Steps S210 and S220), and the processings in Steps S180 to S220 are repeated until the calculated outputtable torque Tem becomes larger than the set target torque Td* (Step S230). The engine ECU 24 having received the throttle opening TH drives the throttle motor 136 so as to have a set opening. The slip caused by the idling of the front wheels 63a and 63b can be determined by determining whether the amount of change in the wheel speeds Vw1 and Vw2 from the wheel speed sensors 69a and 69b exceeds a threshold value. Thus, the throttle opening TH is gradually increased while checking that no slip is caused by the idling of the front wheels 63a and 63b until the outputtable torque Tem becomes larger than the target torque Td*, thereby allowing a smooth start of the vehicle without any slip of the front wheels 63a and 63b.

Figure 7:
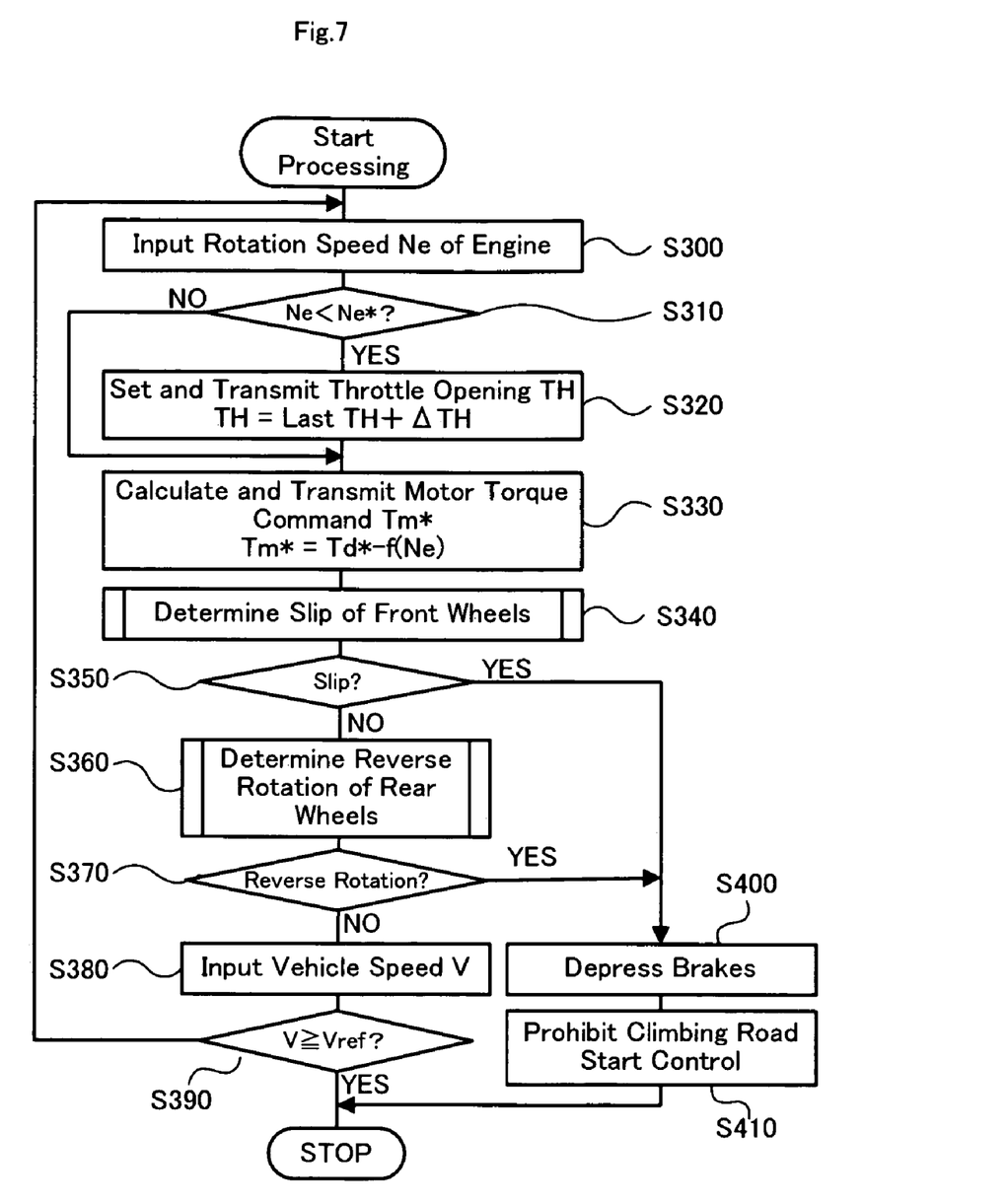
FIG. 7 is a flowchart showing one example of a start processing executed by the hybrid electronic control unit 70.

When the outputtable torque Tem becomes larger than the target torque Td*, the cylinder pressure in the brake wheel cylinders 98c and 98d of the rear wheels 66a and 66b is released, and the brakes of the rear wheels 66a and 66b are also released (Step S240), a start processing shown in FIG. 7 is executed (Step S250), and the routine is finished. When the slip caused by the idling of the front wheels 63a and 63b is determined before the outputtable torque Tem becomes larger than the target torque Td*, the cylinder pressure is generated in the brake wheel cylinders 98a and 98b of the front wheels 63a and 63b (Step S260), the climbing road start control is prohibited (Step S270), and the routine is finished.

To simplify the description, the description on the climbing road start control routine is suspended, and the start processing in FIG. 7 will be described. In the start processing, the rotation speed Ne of the engine 22 is first input (Step S300), it is determined whether the input rotation speed Ne is lower than the target rotation speed Ne* (Step S310). When the rotation speed Ne is lower than the target rotation speed Ne*, the throttle opening TH is increased by the small amount ΔTH and transmitted to the engine ECU 24 (Step S320). Specifically, the throttle opening TH is gradually increased until the rotation speed Ne reaches the target rotation speed Ne*. Then, a torque command Tm* of the motor 40 is calculated as a value obtained by subtracting, from the target torque Td*, the torque calculated based on the rotation speed Ne and output from the engine 22 to the front wheels 63a and 63b, and the calculated torque command Tm* is transmitted to the motor ECU 42 (Step S330). The motor ECU 42 having received the torque command Tm* switches and controls switching elements of the inverter 41 so that the torque command Tm* is output from the motor 40. This allows the target torque Td* to be output to the front wheels 63a and 63b and the rear wheels 66a and 66b as a whole, and the vehicle can start even on the climbing road. Then, it is checked that no slip is caused by the idling of the front wheels 63a and 63b (Steps S340 and S350), and that the rear wheels 66a and 66b do not rotate in a reverse direction (Steps S360 and S370), and the process returns to Step S300 to repeat the processings in Steps S300 to S390 until the vehicle speed V reaches the threshold value Vref or higher (Steps S380 and S390). The determination of the slip caused by the idling of the front wheels 63a and 63b has been described above. The determination whether the rear wheels 66a and 66b rotate in the reverse direction may be made by determining whether the rear wheels 66a and 66b rotate in a reverse direction relative to the rotation in a forward direction determined from the gearshift position SP by the wheel speeds Vw3 and Vw4 from the wheel speed sensors 69c and 69d mounted to the rear wheels 66a and 66b, or by determining whether the motor 40 rotates in a reverse direction based on the rotational position detection sensor 43 of the motor 40. The threshold value Vref is a vehicle speed V for determining the completion of the start, and for example, the values of 3 km/h or 4 km/h may be used. When the vehicle speed V reaches the threshold value Vref or higher without the determination of the slip caused by the idling of the front wheels 63a and 63b and the reverse rotation of the rear wheels 66a and 66b, it is determined that the start is completed, and the start processing is finished. When the slip caused by the idling of the front wheels 63a and 63b and the reverse rotation of the rear wheels 66a and 66b are determined before the vehicle speed V reaches the threshold value Vref or higher, the cylinder pressure is generated in the brake wheel cylinders 98a to 98d to stop the start (Step S400), the climbing road start control is prohibited (Step S410), and the start processing is finished.

Figure 8:
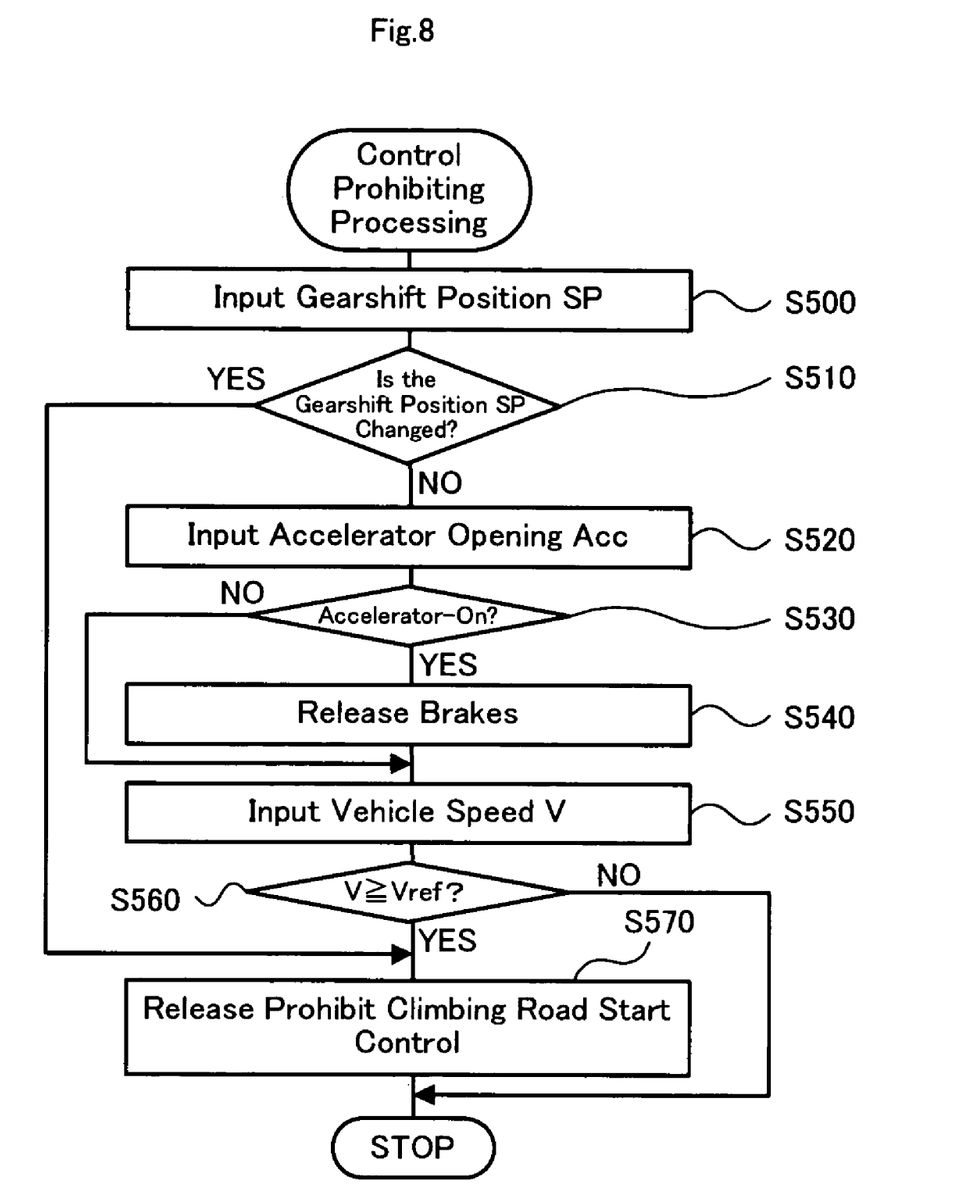
FIG. 8 is a flowchart showing one example of a control prohibiting processing executed by the hybrid electronic control unit 70.

The description returns to the description on the climbing road start control routine in FIG. 4. When it is determined in Step S100 of this routine that the climbing road start control is prohibited, a control prohibiting processing in FIG. 8 is executed (Step S280), and the routine is finished. In the control prohibiting processing, the gearshift position SP from the gearshift position sensor 82 is first input (Step S500), and it is determined whether the gearshift position SP is changed (Step S510). When the gearshift position SP is changed, the prohibition of the climbing road start control is removed (Step S570), and the routine is finished. For example, the climbing road start control is performed in a forward position (a D position), the slip caused by the idling of the front wheels 63a and 63b is determined in Steps S210 and S220, and the climbing road start control is prohibited. Then, when the driver operates the shift lever 81 to a backward position (an R position), it is determined that the gearshift position SP is changed, and the prohibition of the climbing road start control is removed. When the prohibition of the climbing road start control is removed, it is determined in Step S100 that the climbing road start control is not prohibited when the next climbing road start control routine in FIG. 4 is executed, and processings in Step S110 and thereafter are executed.

When the gearshift position SP is not changed, the accelerator opening Acc from the accelerator pedal position sensor 84 is input (Step S520), and it is determined whether the accelerator is depressed (Step S530). When the accelerator is depressed, the brakes of the front wheels 63a and 63b and the rear wheels 66a and 66b are released (Step S540). The brakes are released when the accelerator is depressed for prioritizing a driver's driving operation.

Then, the vehicle speed V is input (Step S550), and when the vehicle speed V is the threshold value Vref or higher, it is determined that the start is completed. There is no need for prohibiting the climbing road start control, and thus the prohibition of the climbing road start control is removed (Step S570), and the routine is finished. On the other hand, when the vehicle speed V is lower than the threshold value Vref, it is determined that the start is not completed, and there is no reason for removing the prohibition of the climbing road start control, and the routine is finished without removing the prohibition of the climbing road start control.

Figure 9:
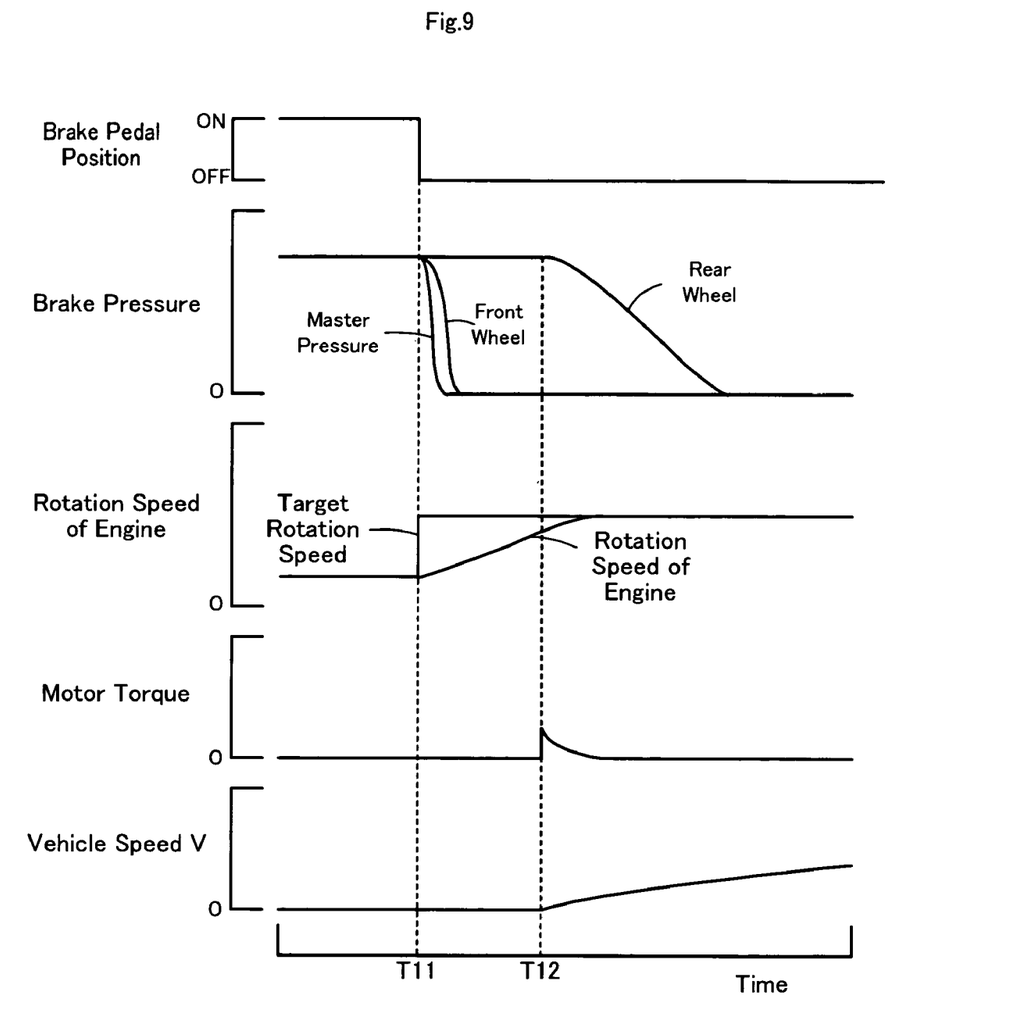
FIG. 9 shows one example of changes with time of a brake pressure, a rotation speed Ne of the engine 22, a torque of the motor 40, and a vehicle speed V at the start of the vehicle by climbing road start control.
Figure 10:
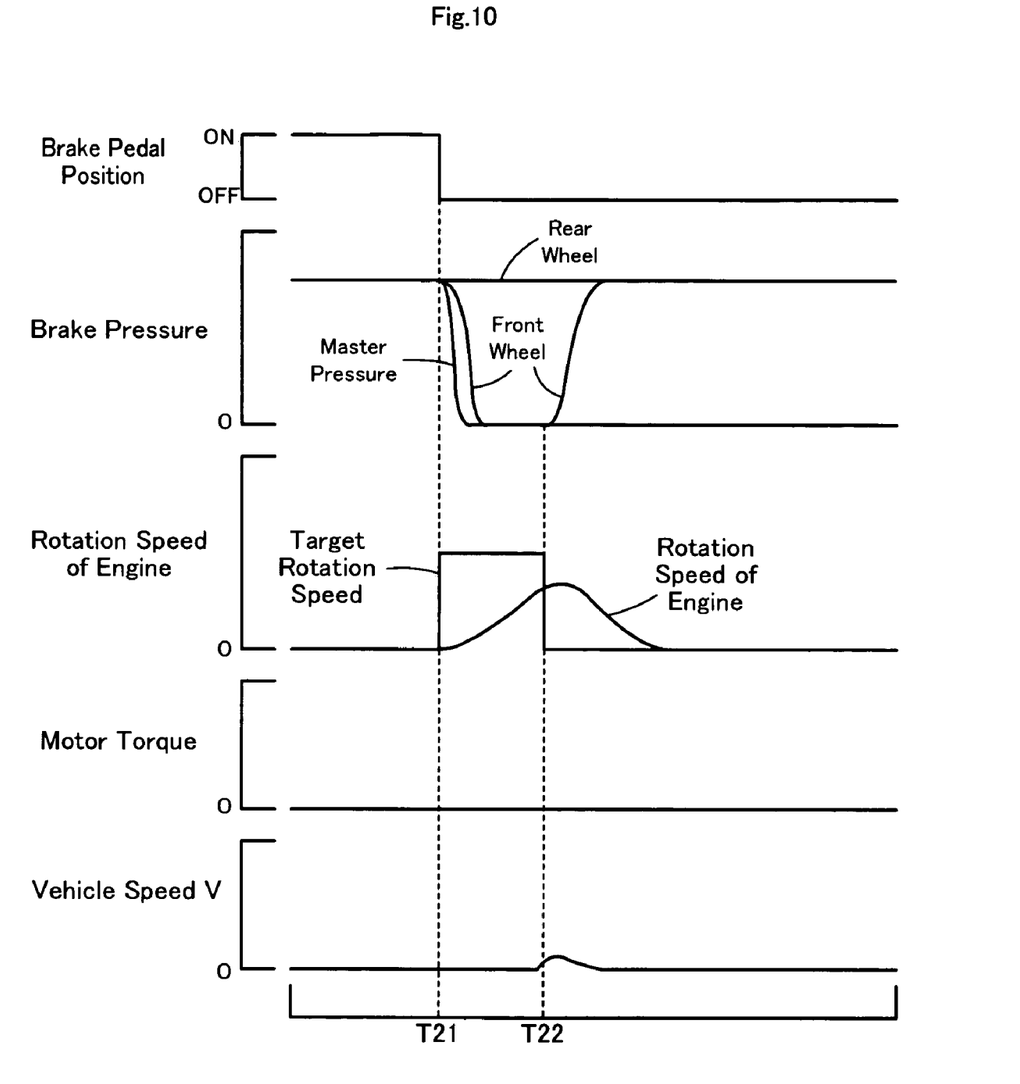
FIG. 10 shows one example of changes with time of a brake pressure, a rotation speed Ne of the engine 22, a torque of the motor 40, and a vehicle speed V when a slip is caused by idling of front wheels 63a and 63b at the start of the vehicle by climbing road start control.

FIG. 9 shows one example of changes with time of the brake pressure, the rotation speed Ne of the engine 22, the torque of the motor 40, and the vehicle speed V at the start of the vehicle by the climbing road start control, and FIG. 10 shows one example of changes with time of the brake pressure, the rotation speed Ne of the engine 22, the torque of the motor 40, and the vehicle speed V when the slip is caused by the idling of the front wheels 63a and 63b at the start of the vehicle by climbing road start control. As shown in FIG. 9, the brake pedal 85 is returned and the brakes are released at time T11, the cylinder pressure in the brake wheel cylinders 98a and 98b of the front wheels 63a and 63b is released with the cylinder pressure in the brake wheel cylinders 98c and 98d of the rear wheels 66a and 66b being held, and the target rotation speed Ne* of the engine 22 is set according to the road gradient θ. Then, the throttle opening TH of the engine 22 is gradually increased to increase the rotation speed Ne of the engine 22. The torque is output from the motor 40 and the brakes of the rear wheels 66a and 66b are gradually released at time T12 when the outputtable torque Tem that is the sum of the torque output from the engine 22 to the front wheels 63a and 63b and the torque outputtable from the motor 40 becomes larger than the target torque Td* with no slip being caused by the idling of the front wheels 63a and 63b. Thus, the vehicle speed V is gradually increased to complete the start of the vehicle. On the other hand, as shown in FIG. 10, when the brake pedal 85 is returned and the brakes are released at time T21, similarly, the brakes of the front wheels 63a and 63b only are released with the brakes of the rear wheels 66a and 66b being held, the target rotation speed Ne* of the engine 22 is set according to the road gradient θ, and the throttle opening TH of the engine 22 is gradually increased, thereby increasing the rotation speed Ne of the engine 22. When the slip caused by the idling of the front wheels 63a and 63b is determined at time T22, the released brakes of the front wheels 63a and 63b are returned to the original state, and the climbing road start control is prohibited. Thus, the target rotation speed Ne* of the engine 22 is released and the rotation speed Ne of the engine 22 is reduced to hold the vehicle stopping on the climbing road.

According to the hybrid vehicle 20 of the embodiment, when the driver returns the brake pedal 85 in the state of stopping on the climbing road, the brakes of the front wheels 63a and 63b to which the power is output from the engine 22 are released with the brakes of the rear wheels 66a and 66b being held, the throttle opening TH is gradually increased so that the rotation speed Ne of the engine 22 gradually reaches the target rotation speed Ne* of the engine 22 set according to the road gradient θ, the brakes of the rear wheels 66a and 66b are released and the output of the torque from the motor 40 is started to output the target torque Td* when the outputtable torque Tem that is the sum of the torque output from the engine 22 to the front wheels 63a and 63b and the torque outputtable from the motor 40 becomes larger than the target torque Td* set according to the road gradient θ, thereby allowing a smooth start of the vehicle on the climbing road. Further, when the slip caused by the idling of the front wheels 63a and 63b is determined while gradually increasing the rotation speed Ne of the engine 22, the brakes of the front wheels 63a and 63b are returned to the original state to hold the stopping state, thereby properly addressing the problem when the vehicle cannot smoothly start because of the slip of the front wheels 63a and 63b.

In the hybrid vehicle 20 of the embodiment, when the slip caused by the idling of the front wheels 63a and 63b at the start of the vehicle on the climbing road or the reverse rotation of the rear wheels 66a and 66b are determined, the climbing road start control is prohibited, then, when the gearshift position SP is changed or the driver depresses the accelerator pedal 83 to cause the vehicle speed V to reach the threshold value Vref, the prohibition of the climbing road start control is removed, thereby allowing the climbing road start control to be properly performed at the next start of the vehicle on the climbing road.

In the hybrid vehicle 20 of the embodiment, the motor 40 that outputs the power to the rear shaft 67 of the rear wheels 66a and 66b is provided, but the motor 40 may not be provided. In this case, the brakes of the rear wheels 66a and 66b may be released when the torque output from the engine 22 to the front wheels 63a and 63b becomes larger than the target torque Td*, or the brakes of the rear wheels 66a and 66b may be released when the torque output from the engine 22 to the front wheels 63a and 63b becomes larger than a torque slightly smaller than the target torque Td*. The brakes of the rear wheels 66a and 66b may be released after the rotation speed Ne of the engine 22 reaches the target rotation speed Ne*. In this case, the brakes of the rear wheels 66a and 66b may gradually released as in the embodiment, or may be released in an instant.

In the hybrid vehicle 20 of the embodiment, when the rear wheels 66a and 66b rotate in the reverse direction in the start processing, the brakes are returned to the original state to prohibit the climbing road start control. However, when the rear wheels 66a and 66b rotate in the reverse direction even before the start processing, the brakes may be returned to the original state to prohibit the climbing road start control. Alternatively, the brakes may not be returned to the original state and may continue the climbing road start control even if the rear wheels 66a and 66b rotate in the reverse direction.

In the hybrid vehicle 20 of the embodiment, when the slip caused by the idling of the front wheels 63a and 63b is determined, the brakes of the front wheels 63a and 63b are returned to the original state to prohibit the climbing road start control, but the brakes of the front wheels 63a and 63b may not be returned to the original state and may continue the climbing road start control even if the slip caused by the idling of the front wheels 63a and 63b is determined.

In the hybrid vehicle 20 of the embodiment, when the climbing road start control is prohibited, the prohibition of the climbing road start control is removed if the gearshift position SP is then changed or the driver depresses the accelerator pedal 83 to cause the vehicle speed V to reach the threshold value Vref, but the prohibition of the climbing road start control may be removed when the movement of the vehicle is detected.

In the hybrid vehicle 20 of the embodiment, if the driver depresses the accelerator pedal 83 when the climbing road start control is prohibited, the brakes of the front wheels 63a and 63b and the rear wheels 66a and 66b are released. However, when the climbing road start control is prohibited, the brakes of the front wheels 63a and 63b and the rear wheels 66a and 66b may be held regardless of the driver's depression of the accelerator pedal 83.

In the hybrid vehicle 20 of the embodiment, the target rotation speed Ne* of the engine 22 is set based on the road gradient θ, but the target rotation speed Ne* of the engine 22 may be set based on the state of the vehicle such as the vehicle speed V in addition to the road gradient θ. Similarly, the target rotation speed Ne* of the engine 22 may be set based on the state of the vehicle such as the vehicle speed V in addition to the road gradient θ.

In the hybrid vehicle 20 of the embodiment, the CVT 50 that is the continuously variable transmission is provided as a transmission, but not limited to the CVT 50, other type of continuously variable transmission such as of a toroidal type may be used, or a stepped transmission may be used.

In the hybrid vehicle 20 of the embodiment, the engine 22 that is the internal combustion engine is used as a front wheel power source, but other power sources such as a motor may be used as the front wheel power source.

The best mode for carrying out the invention has been described with reference to the embodiment, but the present invention is not limited to the embodiment, and various changes may be made without departing from the gist of the present invention.

The disclosure of Japanese Patent Application No. 2005-245960 filed Aug. 26, 2005 including specification, drawings and claims is incorporated herein by reference in its entirety.

What is claimed is:

1. A vehicle comprising:
a first axle that is an axle of front wheels of the vehicle;
a second axle that is an axle of rear wheels of the vehicle;
a power source that can output power to the first axle;
a brake operation detection unit that detects a driver's brake operation;
a braking force applying unit that applies braking forces to said first axle and said second axle based on the driver's brake operation, and can independently apply the braking forces to said first axle and said second axle regardless of the driver's brake operation;
a road gradient detection unit that detects a road gradient in a front-back direction of the vehicle;
a target operation state setting module that sets a target operation state that is an operation state of said power source for outputting, to said first axle, a driving force based on said detected road gradient when said road gradient is a climbing gradient; and
a control module that performs climbing gradient drive control to control said power source and said braking force applying unit so that when said brake operation detection unit detects an operation of releasing the brakes as the driver's brake operation in a climbing gradient stopping state where the vehicle stops on a climbing gradient with the braking force by said braking force applying unit based on the driver's brake operation, the operation state of said power source gradually enters said target operation state and a braking state in said climbing gradient stopping state is gradually released, wherein said climbing gradient drive control is control to release the braking state in said climbing gradient stopping state through an intermediate braking force holding state of releasing the braking force to said first axle while holding the braking force to said second axle in said climbing gradient stopping state.

2. A vehicle according to claim 1, wherein said climbing gradient drive control is a control to enter said intermediate braking force holding state when the operation of releasing said brakes is detected in said climbing gradient stopping state, and release the braking force to said second axle after the operation state of said power source enters said target operation state.

3. A vehicle according to claim 1, further comprising a slip detection unit that detects a slip caused by idling of said first axle, wherein said control module performs control to enter said climbing gradient stopping state when said slip detection unit detects a slip during performance of said climbing gradient drive control and prohibits the performance of said climbing gradient drive control.

4. A vehicle according to claim 3, wherein said control module removes the prohibition of the performance of said climbing gradient drive control when the vehicle moves or a running direction of the vehicle is changed while the performance of said climbing gradient drive control is prohibited.

5. A vehicle according to claim 1, further comprising a rotation detection unit that detects a rotation of said second axle, wherein said control module, when said rotation detection unit detects a rotation of said second axle in a reverse direction relative to a forward direction during performance of said climbing gradient drive control, performs control to enter said climbing gradient stopping state and prohibits the performance of said climbing gradient drive control.

6. A vehicle according to claim 5, wherein said control module removes the prohibition of the performance of said climbing gradient drive control when the vehicle moves or a running direction of the vehicle is changed while the performance of said climbing gradient drive control is prohibited.

7. A vehicle according to claim 1, further comprising an accelerator operation detection unit that detects a driver's accelerator operation, wherein said control module performs accelerator operating control to control said braking force applying unit so as to release the braking force to said first axle and the braking force to said second axle when said accelerator operation detection unit detects the accelerator operation.

8. A vehicle according to claim 1, further comprising a motor that can input and output power to and from said second axle, wherein said control module controls said motor based on a driver's accelerator operation.

9. A vehicle according to claim 8, wherein said control module performs control so that the power is output from said motor when the operation state of said power source enters said target operation state.

10. A control method of a vehicle at a stop on a climbing gradient, said vehicle comprising: a first axle that is an axle of front wheels of the vehicle; a power source that can output power to the first axle; and a braking force applying unit that can independently adjust a braking force to said first axle and a braking force to a second axle that is an axle of rear wheels of the vehicle, said control method comprising the steps of:

(a) setting a target operation state that is an operation state of said power source for outputting, to said first axle, a driving force based on a road gradient from a climbing gradient stopping state where the vehicle stops on the climbing gradient by a driver's brake operation to release of the driver's brake operation; and (b) performing climbing gradient drive control to control said power source and said braking force applying unit so that when the driver's brake operation is released, the operation state of said power source gradually enters said target operation state and a braking state by the driver's brake operation is gradually released, and the step of performing climbing gradient drive control controls to release the braking state in said climbing gradient stopping state through an intermediate braking force holding state of releasing the braking force to said first axle while holding the braking force to said second axle in said climbing gradient stopping state.

11. A control method of a vehicle according to claim 10, wherein said step (b) controls to enter said intermediate braking force holding state when the operation of releasing said brakes is detected in said climbing gradient stopping state, and to release the braking force to said second axle after the operation state of said power source enters said target operation state.

12. A control method of a vehicle according to claim 10, said vehicle further comprising a slip detection unit that detects a slip caused by idling of said first axle, wherein said step (b) is the step of controlling to enter said climbing gradient stopping state when a slip is caused by idling of said first axle during performance of said climbing gradient drive control and prohibits the performance of said climbing gradient drive control.

13. A control method of a vehicle according to claim 12, wherein said step (b) removes the prohibition of the performance of said climbing gradient drive control when the vehicle moves or a running direction of the vehicle is changed while the performance of said climbing gradient drive control is prohibited.

14. A control method of a vehicle according to claim 10, wherein said step (b) performs control to enter said climbing gradient stopping state when said second axle rotates in a reverse direction relative to a forward direction during performance of said climbing gradient drive control, and prohibits the performance of said climbing gradient drive control.

15. A control method of a vehicle according to claim 14, wherein said step (b) removes the prohibition of the performance of said climbing gradient drive control when the vehicle moves or a running direction of the vehicle is changed while the performance of said climbing gradient drive control is prohibited.

16. A control method of a vehicle according to claim 10, said vehicle further comprising an accelerator operation detection unit that detects a driver's accelerator operation, wherein said step (b) is the step of controlling said braking force applying unit so as to release the braking force to said first axle and the braking force to said second axle when the driver performs the accelerator operation.

* * * * *